United States Patent Office 3,636,013
Patented Jan. 18, 1972

3,636,013
OESTROGENS
Michel Rolland, Paris, France, assignor to Les
Laboratoires Albert Rolland, Paris, France
No Drawing. Filed Aug. 2, 1966, Ser. No. 569,597
Claims priority, application France, Aug. 5, 1965,
27,431
Int. Cl. C07c 169/08
U.S. Cl. 260—397.5                                           1 Claim

ABSTRACT OF THE DISCLOSURE 3-ethoxy-1,3,5-estratriene-16α,17β-diol is a novel estrogen producing no secondary estrogenic effects such as swelling of the mammary glands or histologic alternations of male sex glands or tissues when administered. The compound is obtained from the corresponding 17-keto compound by reduction with a borohydride.

This invention relates to oestrogene, processes for their preparation, and compositions containing the same.

The present invention provides the new oestrogen 3-ethoxy-estra-1,3,5-triene-16α,17β-diol of the formula:

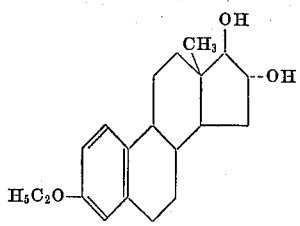

This compound forms white colourless crystals melting at 178–181° C. It is soluble in ether, chloroform and olive oil, but only sparingly soluble in water. The optical rotation of a 1% solution in ethanol is $\alpha_D = +65°$.

The new compound may be characterised by the following test. A few milligrams of the compound is warmed with about 20 times its weight of p-toluenesulphonic acid in a test tube on an oil bath at 110–120° C. Heating is continued for about 3 minutes until the mixture is completely molten, and the later is then allowed to cool. The product obtained has a grey colour and shows a rose-violet fluorescence; the colour changes to pale blue after a few hours.

According to a feature of the invention, the new steroid is obtained by the reduction of the corresponding 17-oxo-steroid, e.g. with an alkali metal borohydride, for example potassium borohydride, in a lower alkanol. The 17-oxo compound is itself obtained by acid hydrolysis of the corresponding 17-ketal. This ketal is obtained by the action of an alkali metal alkoxide of 16α-bromo-oestrone-3-ethyl ether, and the later is obtained by the bromination of the corresponding enol acetate, itself prepared by the action of isopropenyl acetate on the 3-ethyl ether of oestrone. Exemplary methods of carrying out these reactions are given in the example below.

EXAMPLE 10 g. of oestrone 3-ethyl ether are mixed with 70 cm.³ of isopropenyl acetate and a few drops of concentrated sulphuric acid are added as catalyst. The mixture is heated under reflux for 2 hours, and 20 cm.³ of isopropenyl acetate are then distilled off in one hour. A further 40 cm.³ of isopropenyl acetate are then added, and the mixture is concentrated to half its volume by distillation for one hour. The mixture is allowed to cool and taken up in ether, and the ethereal solution is washed with ice-cold sodium bicarbonate solution and then with water. The washed ethereal extract is dried over anhydrous sodium sulphate and evaporated to dryness in vacuo. The residue is recrystallised twice from ethanol, and the product obtained, the enol acetate of oestrone 3-ethyl ether (about 7.5 g.), has a melting point of 104–105° C.

The product of the preceding stage is dissolved in 120 cm.³ of hot carbon tetrachloride. The solution is cooled in an ice bath, and then a solution of 1 cm.³. of bromine in 200 cm.³ of carbon tetrachloride is added slowly with agitation. Agitation is continued for 5 minutes and the solution is then concentrated in vacuo at 30° C. The residue is triturated with 30 cm.³ of diethyl ether, the ether is filtered off, and the residue is washed with 10 cm.³ of diethyl ether. About 7 g. of the 3-ethyl ether of 16α-bromo-oestrone is thus obtained, M.P. 158–164° C.

The product of the preceding stage is added to 260 cm.³ of anhydrous methanol and this mixture is then added to a solution of sodium methoxide formed by dissolving 2.25 g. of sodium in 70 cm.³ of anhydrous methanol. The mixture is heated under reflux until the solids have dissolved and then allowed to stand for 18 hours at ambient temperature. The solution obtained is concentrated in vacuo at 30° C. 100 cm. ³ of water are added to the residue, and the mixture is agitated and filtered. The residue is washed with water to neutrality, and 6.5 g. of 3-ethoxy-17,17-dimethoxy - 16α-hydroxy-estratriene, M.P. 129–132° C., are thus obtained.

The product of the preceding stage is dissolved in 100 cm.³ of acetone, and 600 cm.³ of methanol are added followed by 100 cm.³ of 6 N sulphuric acid. The mixture is heated under reflux for 2 hours, and then concentrated to one third of its bulk. 100 cm.³ of water are added and the mixture is again concentrated in vacuo, to eliminate 100 cm.³ of solvent. The mixture is then kept for one hour in a refrigerator, filtered, and the residue is washed with water. 5.5 g. of 3-ethoxy-16α-hydroxy-17-oxo-estra-triene are thus obtained.

The product of the preceding stage is dissolved in 50 cm.³ of methanol and 5 g. of potassium borohydride are added. The mixture is agitated for 2 hours and then allowed to stand for 12 hours at ambient temperature. After acidification with 50% acetic acid, the methanol is eliminated by evaporation in vacuo at 35° C. The mixture is filtered, and the residue is washed with water and dried. 4.7 g. of 3-ethoxy-estra-1,3,5-triene-16α, 17β-diol M.P. 165–175° C., are thus obtained. After recrystallisation from acetone, it melts at 178–181° C. Its analysis is as follows: calculated (percent): C=75.92; H=8.92; $OC_2H_5$=14.24. Found (percent): C=75.87; H=8.97; $OC_2H_5$=14.33.

The new compound has a very low toxicity, and when given in a dose of 1 gram/kg., either orally or by intraperitoneal injection to mice or rats, no sign of toxicity is observed in the ensuing 72 hours.

The new compound has a particularly strong oestrogenic effect which should make it useful in the treatment of atherosclerosis if the current theories in connection with that disease are correct. This effect is all the more valuable in that the compound produces no secondary oestrogenic effects such as swelling of the mammary glands, or histological alteration or even inhibition of the prostate gland and the seminal vesicles.

The oestrogenic effects of a compound can be determined by studying its ability to provoke oestrus in castrated rats by the method of Allen and Doisy. In this test, the vaginal keratinisation of the castrated rat is verified by taking vaginal smears. It is known that, for example, 2 micrograms of oestradiol benzoate administered parenterally provokes this keratinisation in 100% of cases. The compound to be studied can thus be compared with oestradiol benzoate; if x micrograms of the compound under text provoke oestrus, it is possible to say that its oestrogenic effect is n times more feeble than oestradiol benzoate, where $n=x/2$. On the other hand, the feminising effect of a hormone can be determined by its action on the male genital tract and on certain secondary sexual glands such as the apocrine glands. This action is shown by a partial atrophy of the seminal glands and the prostate, and may be measured by the weight of these organs. The apocrine glands have the property of being converted, by the action of oestrogenic hormones, into mammary glands, leading to the secretion of colostrum. In the tests usually carried out, the reference compound is either oestradiol benzoate administered parenterally or ethynyl-oestradiol administered orally.

In order therefore to obtain the best effect in the treatment of atherosclerosis without risking the occurrence of inconvenient secondary oestrogenic effects, it is necessary that the compound should show a high oestrogenic effect with a low feminising effect. The tables given below show the results obtained in tests on the compound of the present invention.

Tables I and II show the results of two different experiments in which the named compounds were administered to adult male rats orally.

TABLE I

| | Number of animals | Weight of organs in mg. per 100 g. of body weight | |
|---|---|---|---|
| | | Seminal vesicles | Prostate |
| Controls | 16 | 145±15 | 196±12 |
| Ethynyl-estradiol, 10 mg | 19 | 31±4 | 86±9 |
| Compound of the invention, 250 mg | 20 | 79±9 | 147±9 |
| Compound of the invention, 500 mg | 19 | 65±10 | 130±10 |

TABLE II

| | Number of animals | Weight of organs in mg. per 100 g. of body weight | |
|---|---|---|---|
| | | Seminal vesicles | Prostate |
| Controls | 18 | 189±11 | 238±12 |
| Ethynyl-estradiol, 10 mg | 20 | 79±9 | 135±9 |
| Compound of the invention, 1,000 mg | 20 | 33±2.5 | 89±4 |

It will be appreciated that the feminising effect of the different compounds may be compared by comparing the weights of the seminal vesicles and the prostate glands of the treated rats. The tables show that in doses of 250 and 500 mg. the feminising effect of the compound of the invention is two to three times weaker than that of ethynyl-oestradiol.

In Table III below, the results of tests made according to the method of Allen and Doisy are given comparing the new compounds with oestrone and oestriol:

TABLE III

| | | Dose provoking oestrus, in mg. | |
|---|---|---|---|
| Compound | Number of animals | Parenteral administration | Oral administration |
| Oestrone | 350 | 3.5 | 10 |
| Oestriol | 124 | 90–100 | 80–100 |
| Compound of the invention | 70 | 500 | 125 |

The invention includes within its scope pharmaceutical compositions comprising the new compound in association with a pharmaceutically acceptable carrier or diluent. Such compositions are preferably made up in the form suitable for oral or parenteral administration, and suitable types of composition include tablets, pills, capsules, syrups and elixirs for oral administration, and sterile injectable solutions and suspensions for parenteral administration. The diluents may be those commonly used in the art for the preparation of such compositions provided only that they are compatible with the active compound. The proportion of active substance will, in general, be from 5% to 95% in the case of solid compositions for oral administration, and 1% to 20% in the case of sterile injectable compositions.

I claim:
1. 3-ethoxy-estra-1,3,5-triene-16α,17β-diol.

References Cited

FOREIGN PATENTS 804,789   11/1958   Great Britain _____ 260—397.5

OTHER REFERENCES

Fishman, Journal Org. Chem. (1958), vol. 23, No. 8, pp. 1190–1192.

ELBERT L. ROBERTS, Primary Examiner

U.S. Cl. X.R.

260—397.4